United States Patent [19]

Postema

[11] 4,240,531
[45] Dec. 23, 1980

[54] LOW-WEAR SHOCK ABSORBER

[75] Inventor: Pieter M. Postema, Oud-Beijerland, Netherlands

[73] Assignee: ITT Industries, Inc., New York, N.Y.

[21] Appl. No.: 544

[22] Filed: Dec. 26, 1978

[51] Int. Cl.³ .............................................. F16F 9/00
[52] U.S. Cl. .................................... 188/315; 188/322
[58] Field of Search ................................ 188/322, 315

[56] References Cited

U.S. PATENT DOCUMENTS

| 2,036,623 | 4/1936 | Focht | 188/315 |
| 2,138,513 | 11/1938 | Rossman et al. | 188/315 |
| 2,240,644 | 5/1941 | Focht | 188/315 |

FOREIGN PATENT DOCUMENTS 709338  5/1954  United Kingdom ................. 188/322

*Primary Examiner*—Douglas C. Butler
*Attorney, Agent, or Firm*—James B. Raden; William J. Michals

[57] ABSTRACT

A shock absorber comprising a cylinder which is divided into two chambers by a piston slidably mounted therein. A casing surrounds the cylinder and forms a reservoir therebetween. The reservoir is divided into two chambers by a ring-shaped seal having a restricted opening therein. A cap closes the upper ends of the cylinder and the casing and guides the piston rod through a piston rod packing therein. A pipe connects the lower portion of the cylinder to the restricted opening and includes a one-way valve therein. A ring-shaped chamber in the cap surrounds the piston rod adjacent to the piston rod packing and communicates with the upper reservoir chamber. This structure permits the damping fluid which leaks around the piston rod to drain into the upper reservoir; and upon the buildup of heat-related pressure at the piston rod packing, the one-way valve opens to relieve the pressure.

2 Claims, 1 Drawing Figure

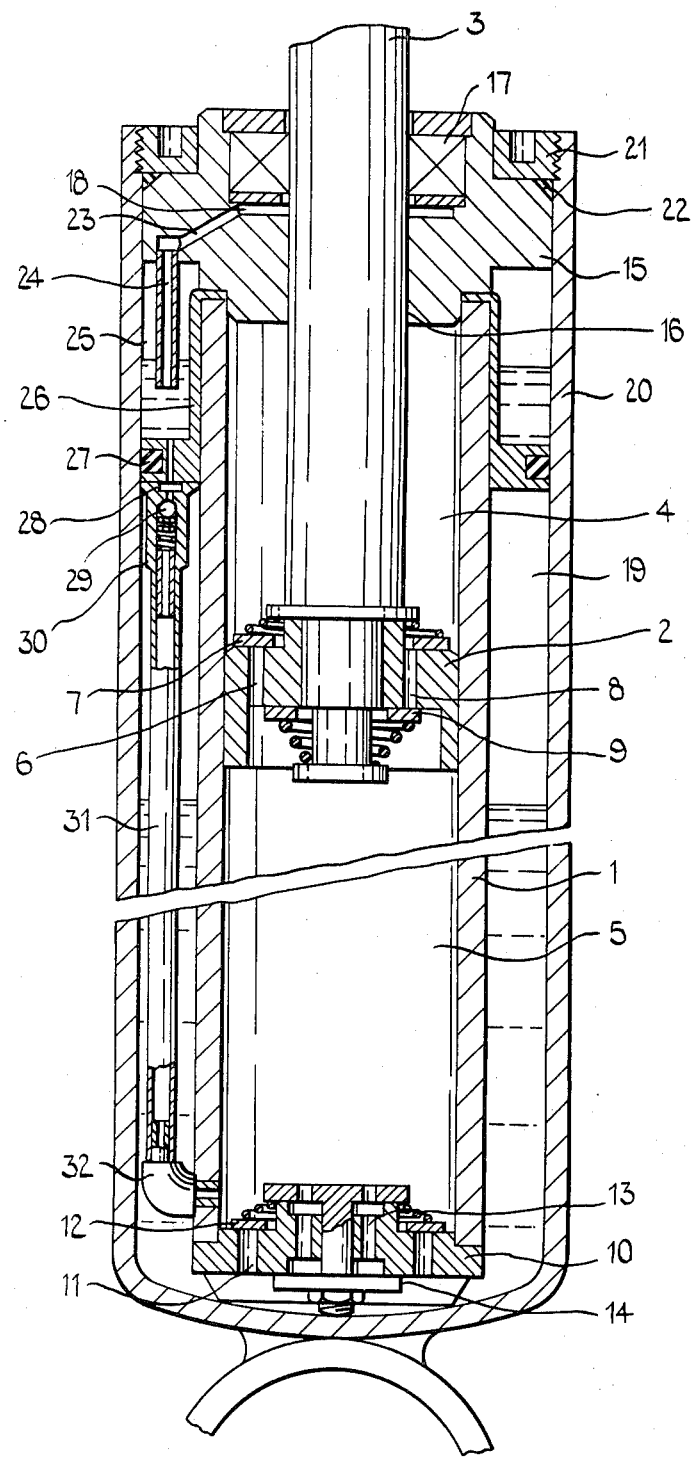

LOW-WEAR SHOCK ABSORBER

BACKGROUND OF THE INVENTION

The invention relates to an arrangement for the relief of the piston rod packing of a hydraulic telescopic shock absorber having a cylinder which is divided into two chambers by a piston movable by a piston rod. The lower cylinder chamber is connected by a non-return valve opening in the direction of the cylinder with a reservoir arranged outside of the clyinder to supply damping medium to the cylinder during outgoing piston rod volume. The upper cylinder chamber is closed by a cover or cap in which the piston rod is guided and in which the piston rod packing is arranged. In the space between the piston rod guide and the piston rod packing one or more drain channels are connected for draining damping medium which is leaking along the piston rod guide.

In such prior art shock absorbers the drain channels outlet or drain into the damping medium reservoir which is filled partially with damping fluid and partially with air under atmospheric pressure and in which during normal operation the overall pressure is small even when the piston rod volume driven out of the cylinder is taken up in the reservoir. However, during intensive operation of the shock absorber the temperature thereof may rise substantially due to heat generation in the cylinder and because the air in the reservoir is also heated. Accordingly, the pressure can rise to undesirably high values. This is also caused by the restricted capacity of the reservoir which is dimensioned as small as possible so that the shock absorber can be installed in a restricted space. With the usual proportion of the fluid volume and air volume of 1:1 in the reservoir with a fully loaded shock absorber and when the piston rod is retracted, a temperature rise up to 185° C. has been measured causing an excessive pressure of 4 bar in the whole system. Due to the high friction caused by the high pressure the packing is subjected to premature wear and loses its sealing function.

SUMMARY OF THE INVENTION

It is an object of the present invention to provide a construction to relieve the piston rod packing from pressure as much as possible. The device according to the present invention is characterized in that the drain channels outlet in a second reservoir which is additionally only connected to the lower cylinder chamber and in which in said connection a restriction and a non-return valve which opens in the direction of the cylinder are arranged. In accordance with the present invention, it has been found that after the abovementioned temperature rise has been reached, the pressure buildup under the packing amounts to only 1.25 bar and the sealing function of the packing is completely maintained.

BRIEF DESCRIPTION OF THE DRAWING

The invention will become more apparent through a detailed consideration of the following detailed description taken in conjunction with the accompanying drawing in which the single FIGURE shows a longitudinal sectional view of a hydraulic telescopic shock absorber in which the device according to the invention is incorporated.

DETAILED DESCRIPTION

A piston 2 which separates a cylinder 1 in an upper cylinder chamber 4 and a lower cylinder chamber 5 is reciprocatingly driven by a piston rod 3. In the piston 2 continuous passageways 6, terminated by a non-return valve 7 and continuous passageways 8, terminated by a damping valve 9 are arranged. The lower cylinder chamber 5 is terminated by a base valve or valve housing 10 in which continuous passageways 11, terminated by a non-return valve 12 and continuous passageways 13, terminated by a damping valve are arranged. The upper cylinder chamber 4 is closed by a cover 15 in which a bore 16 is arranged for guiding the piston rod 3 and a gland 17 is arranged for sealing piston rod 3. A ring-shaped chamber 18 is arranged between the bore 16 and the sealing ring 17.

A reservoir chamber 19 surrounding the cylinder 1 and containing damping medium is provided by a casing 20, inside of which the various elements are arranged and retained by a ringnut 21 and sealed by a gland 22. One or more drain channels 23, 24 provided in the cylinder cover 15 connect the ring-shaped chamber 18 with a second reservoir chamber 25 provided by a ring-shaped separating member 26 which is clamped between the cylinder 1 and the cylinder cover 15 and which is sealed against the inner-surface of casing 20 by a sealing ring 27.

A restriction 28 is arranged in the bottom of second reservoir 25 by which said reservoir communicates through a one-way or non-return valve 29, which is loaded by a spring in the direction of the reservoir, with pipe 31 which leads through a fitting 32 to the lower cylinder chamber 5. During the assembly of the shock absorber, the cylinder 1 is completely filled with damping medium and both reservoir chambers 19 and 25 are partly filled with damping medium.

The operation of the arrangement is as follows. During the compression or ingoing stroke of the shock absorber damping medium is forced out of the lower cylinder chamber 5 through the piston passages 6 and the non-return valve 7 into the upper cylinder chamber 4. The surplus of the damping medium in the cylinder chamber 5 caused by the penetrating piston rod volume is forced through the valve housing 10 through the passages 13 and the damping valve 14 to the reservoir chamber 19. The damping resistance of valve 14 during the ingoing stroke causes excessive pressure in the complete cylinder 1 by which pressure some damping medium will escape along the piston rod bore 16 to the ring-shaped chamber 18 and will drain through the drain channels 23, 24 into the second reservoir chamber 25. During this action the nonreturn valve 29 will be closed by the pressure in the cylinder.

During the rebound or outgoing stroke of the shock absorber the non-return valve 7 on top of the piston 2 is closed and damping medium out of the upper cylinder chamber 4 can only escape under pressure through the passageways 8 and the damping valve 9 into the cylinder chamber 5, in which cylinder 5 the shortage of damping medium caused by the outgoing piston rod volume is replenished out of reservoir 19 through passageways 11 and non-return valve 12 in the valve house 10. During this action the upper cylinder chamber 4 is under excessive pressure, some damping medium therefore will be forced along the piston rod bore 16 into the reservoir 25, in much the same manner as during the ingoing stroke. At the same time the pressure in lower cylinder chamber 5 is reduced as a function of the suction resistance of valve 12. This reduction in pressure functions through connection 32, 31 to lift the non-return valve 29 against the pressure of spring 30 thereby causing damping medium to be sucked out of reservoir 25.

Because a reduction in pressure occurs in the lower cylinder chamber 5 during each outgoing stroke of the shock absorber, the reservoir 25 and accordingly the sealing ring 17 will be relieved of excessive pressure, even during intensive operation of the shock absorber when the temperature of the damping medium and accordingly the pressure in the whole system rises sharply.

By proper dimensioning of bore 16, and selection of the opening pressures of the non-return valves 12 and 29 and of the flow-resistance of the restriction 28, it is possible to control the amount of a medium replenished in reservoir 25 during the ingoing and outgoing strokes and the amount of medium sucked out of reservoir 25 during the outgoing stroke. Accordingly, the medium level in reservoir 25 is maintained substantially constant. While it was initially believed that an additional float valve in the reservoir 25 would be needed so as to maintain a constant medium level, it has been found that a proper dimensioning of the above elements is nevertheless sufficient. It should also be appreciated that the restriction 28 serves to prevent the reservoir 25 from being completely drained by a first rebound or outgoing stroke of the shock absorber.

I claim:

1. A shock absorber comprising, in combination:
   a cylinder which is divided into upper and lower cylinder chambers by a piston slidably mounted therein;
   a casing surrounding said cylinder coaxially therewith and forming a reservoir chamber between the outer wall of said cylinder and the inner wall of said casing, said casing being closed at the lower end thereof;
   a cap enclosing the upper ends of said cylinder and said casing;
   a piston rod connected to said piston and extending through a seal-forming opening in said cap;
   a passageway in said cap connecting said seal-forming opening with the upper portion of said reservoir;
   a base valve mounted to the lower end of said cylinder and provided with valved passageways connecting said reservoir with said lower cylinder chamber;
   an aperture in the lower end of said cylinder adjacent said base valve and connecting said lower cylinder chamber with said reservoir;
   a sealing member mounted in said reservoir at the upper portion of said shock absorber and dividing said reservoir into upper and lower reservoir chambers, said member having a passageway therein connecting said upper and lower reservoir chambers;
   a pipe connected between said aperture and said passageway of said member for connecting said lower cylinder chamber with said upper reservoir chamber;
   a damping medium in said cylinder and partially filling said upper and lower reservoir chambers; and,
   a one-way valve mounted in the passageway provided by said pipe, said one-way valve permitting said damping medium to flow from said upper reservoir chamber and into said lower cylinder chamber.

2. The shock absorber according to claim 1 wherein said cap includes a ring-shaped chamber surrounding said piston rod and in communication with said passageway of said cap.

* * * * *